(12) United States Patent
Peng et al.

(10) Patent No.: US 8,824,176 B2
(45) Date of Patent: Sep. 2, 2014

(54) RESONANT CONVERTING CIRCUIT AND RESONANT CONTROLLER

(75) Inventors: Ke Peng, Wuxi (CN); Li-Min Lee, New Taipei (TW); Chung-Che Yu, New Taipei (TW); Shian-Sung Shiu, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 275 days.

(21) Appl. No.: 13/412,636

(22) Filed: Mar. 6, 2012

(65) Prior Publication Data

US 2013/0121036 A1   May 16, 2013

(30) Foreign Application Priority Data

Nov. 15, 2011   (TW) .............................. 100141499 A

(51) Int. Cl.
 *H02M 1/32* (2007.01)
 *H02M 3/337* (2006.01)
 *H02M 1/00* (2006.01)
(52) U.S. Cl.
 CPC .......... *H02M 3/3376* (2013.01); *Y02B 70/1441* (2013.01); *H02M 1/32* (2013.01); *H02M 2001/0058* (2013.01); *Y02B 70/1433* (2013.01)
 USPC .................. 363/50; 363/16; 363/49

(58) Field of Classification Search
 USPC ...................... 363/49, 50, 16, 56.03
 See application file for complete search history.

(56) References Cited

U.S. PATENT DOCUMENTS

| | | | |
|---|---|---|---|
| 5,812,383 A * | 9/1998 | Majid et al. ................ | 363/21.05 |
| 7,375,987 B2 * | 5/2008 | Kyono ........................ | 363/21.02 |
| 7,391,629 B2 * | 6/2008 | Ryu et al. ..................... | 363/56.1 |
| 8,406,018 B2 * | 3/2013 | Liang .......................... | 363/56.04 |
| 8,624,572 B2 * | 1/2014 | Hosotani ...................... | 323/283 |

* cited by examiner

*Primary Examiner* — Harry Behm
(74) *Attorney, Agent, or Firm* — Jianq Chyun IP Office

(57) ABSTRACT

The resonant converting circuit comprises a resonant circuit, a current detecting circuit and the resonant controller. The resonant controller controls a power conversion of the resonant circuit for converting an input voltage into an output voltage and the resonant controller comprises an over current judgment unit and an over current protection unit. The over current judgment unit determines whether the resonant current is higher than an over current value according to a current detecting signal generated by the current detecting circuit. The over current protection unit generates a protection signal in response to a determined result of the over current judgment unit and an indication signal indicative of an operating state of the resonant controller. The resonant controller executes a corresponding protecting process in response to the protection signal.

12 Claims, 4 Drawing Sheets

(a)

(b)

(c)

(a)

(b)

(c)

RESONANT CONVERTING CIRCUIT AND RESONANT CONTROLLER

CROSS-REFERENCE TO RELATED APPLICATION

This application claims the priority benefit of Taiwan application serial no. 100141499, filed on Nov. 15, 2011. The entirety of the above-mentioned patent application is hereby incorporated by reference herein and made a part of this specification.

BACKGROUND

1. Field of the Invention

The present invention relates to a resonant converting circuit and a resonant controller, and more particularly relates to a resonant converting circuit and a resonant controller with over current protecting function.

2. Description of Related Art

Under the global trend of energy-saving and carbon reduction in the current stage, many countries have legislated energy efficiency regulations or announced energy efficiency certifications. Therefore, the manufacturers devote to increase the conversion efficiency of power system recently. A resonant converting circuit has an advantage of zero voltage switching (ZVS) to substantially decrease the switching loss of transistors and so the resonant converting circuit is applied to more power source systems.

One of important issues of the resonant converting circuit is the over current protection. The over current protection has to be executed immediately and exactly when the resonant converting circuit operates normally, and further is capable of determining false over current conditions, for example: the resonant converting circuit is starting. FIG. 1 is a schematic diagram of a conventional half-bridge LLC resonant converting circuit. A resonant circuit comprises two transistor switches M1 and M2, a resonant capacitance Cr, a resonant inductance Lr, a transformer T (herein, only a primary side of the transformer T is shown), and a resonant controller 10. A detecting resistance Rcs is coupled to the primary side of the transformer T and generates a signal according to a resonant current of the resonant circuit, which is feedback to a current detecting terminal OC of the resonant controller 10 after being filtered by a resistance R1 and a capacitance C1. The resonant controller 10 executes over current protection when a voltage across the capacitance C1 exceeds a set threshold voltage. The circuit design of the over current protection has advantages of simple circuit structure and periodically executing over current protection. However, the aforementioned circuit structure can not differentiate false over current conditions and further the detecting of the detecting resistance Rcs causes power consumption.

FIG. 2 is a schematic diagram of another conventional half-bridge LLC resonant converting circuit. Compared to the half-bridge LLC resonant converting circuit shown in FIG. 1, the main difference is that a detecting capacitance Cs is substituted for the detecting resistance Rcs to detect the resonant current to decrease the power consumption of detecting current. A resistance R4 and a set resistance R5 have functions of voltage-dividing and current limiting, and a filter capacitance C3 has a filtering function. Diodes D1 and D2 have functions of rectification and voltage clamping. A discharge period of the filter capacitance C3 can be set by adjusting a resistance value of the set resistance R5 and a capacitance value of the filter capacitance C3, so as to set a delay time for restarting when the over current condition occurs. In FIG. 2, the current detecting is average current detecting by the filter capacitance C3. Therefore, the false over current state may be filtered by the filter capacitance C3. Nevertheless, the capacitance value of the filter capacitance C3 and the resistance values of the resistance R4 and the set resistance R5 cannot be too large due to that the large capacitance and resistance values cause response time of over current protection to be long, even fail. On the other hand, the capacitance value of the filter capacitance C3 and the resistance values of the resistance R4 and the set resistance R5 are smaller, the delay time for restarting is too short to sufficiently release an energy stored in the resonant circuit.

By the foregoing descriptions, all of the conventional over current protection cannot provide a perfect over current protection for the resonant converting circuit.

SUMMARY

The conventional resonant converting circuit can not determine false over current condition and balance the delay time for restarting against filtering the false over current condition. In the present invention, a resonant controller can execute different over current protection functions in response to different states of the system and is capable of over current determining rapidly and accurately for performing a perfect over current protection.

To accomplish the aforementioned and other objects, an exemplary embodiment of the invention provides a resonant converting circuit, comprising a resonant circuit, a current detecting circuit and a resonant controller. The resonant circuit is adapted to execute a power conversion to convert an input voltage into an output voltage. The current detecting circuit is coupled to a primary side of the resonant circuit to detect a resonant current flowing through the primary side of the resonant circuit and generates a current detecting signal. The resonant controller controls the power conversion of the resonant circuit. The resonant controller comprises an over current judgment unit and an over current protection unit. The over current judgment unit determines whether the resonant current is higher than an over current value according to the current detecting signal. The over current protection unit generates a protection signal in response to a determined result of the over current judgment unit and an indication signal indicative of an operating state of the resonant controller. The resonant controller executes a corresponding protection process in response to the protection signal. Wherein, the operating state of the resonant controller includes a starting state and a normal operating state.

An exemplary embodiment of the invention provides a resonant controller adapted to control a power conversion of a resonant circuit. The resonant controller comprises an over current judgment unit and an over current protection unit. The over current judgment unit determines whether the resonant current is higher than an over current value according to a current detecting signal indicative of a resonant current of the resonant circuit. The over current protection unit generates a protection signal in response to a determined result of the over current judgment unit and an indication signal indicative of the resonant controller operating under a starting state or a normal operating state. The resonant controller executes a corresponding protecting process in response to the protection signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
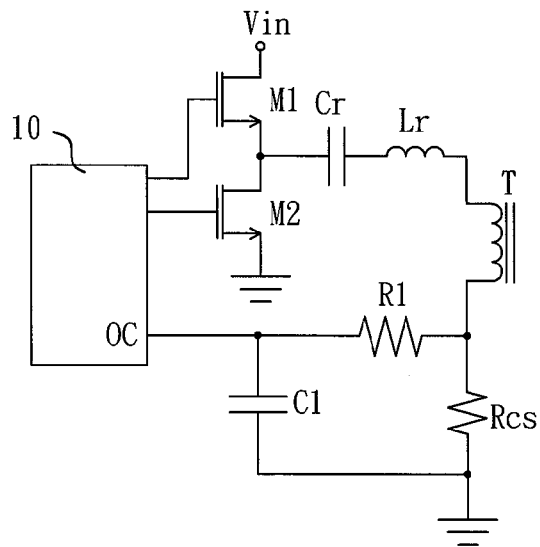
FIG. 1 is a schematic diagram of a conventional half-bridge LLC resonant converting circuit.
Figure 2:
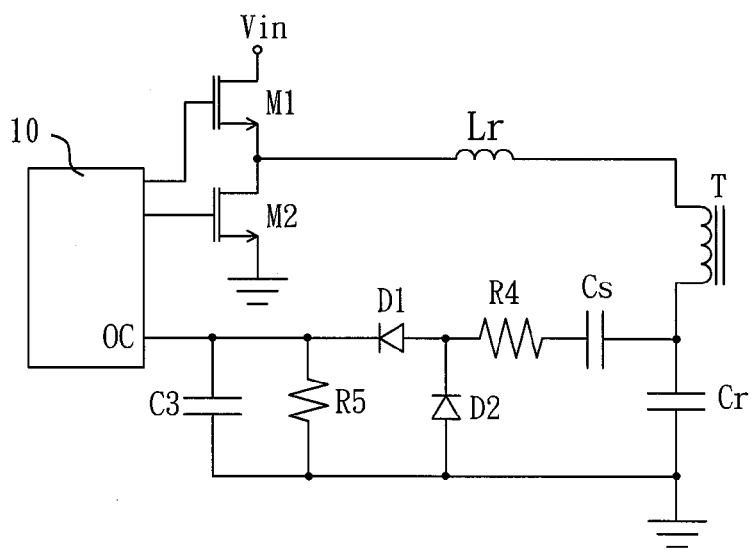
FIG. 2 is a schematic diagram of another conventional half-bridge LLC resonant converting circuit.
Figure 3:
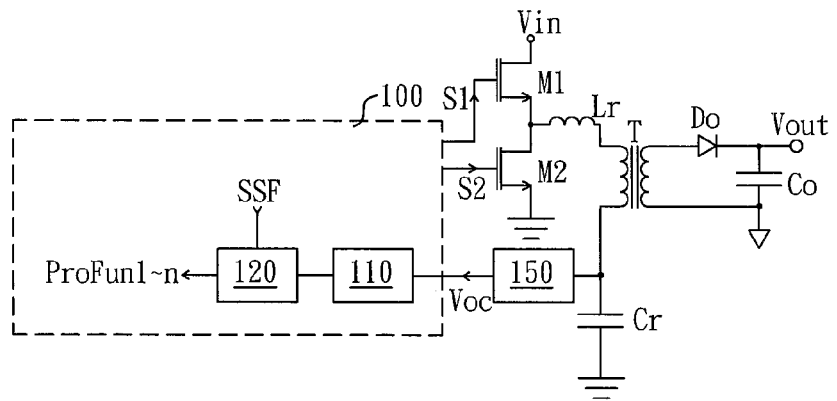
FIG. 3 is a block diagram of a resonant converting circuit of the present invention.

FIG. 3 is a block diagram of a resonant converting circuit of the present invention. The resonant converting circuit comprises a resonant circuit, a current detecting circuit 150 and a resonant controller 100. In the present embodiment, the resonant circuit is a half-bridge LLC resonant circuit, comprising transistor switches M1 and M2, a transformer T, a resonant capacitance Cr, a resonant inductance Lr, a rectifying diode Do and an output capacitance Co. A primary side of the resonant circuit is coupled to an input power source Vin, so as to convert an electric power of the input power source Vin, so as to provide an output voltage Vout rectified by the rectifying diode Do and the output capacitance Co in a secondary side thereof. The current detecting circuit 150 is coupled to the primary side of the resonant circuit to detect a resonant current flowing there through and generates a current detecting signal Voc. The resonant controller 100 switches the transistor switches M1 and M2 in the resonant circuit to modulate an amount of the electric power inputted from the input power source Vin and so controls a power conversion of the resonant circuit. The resonant controller 100 comprises an over current judgment unit 110 and an over current protection unit 120. The over current judgment unit 110 determines whether the resonant current is over or not according to the current detecting signal Voc. The over current protection unit 120 is coupled to the over current judgment unit 110 and receives an indication signal SSF indicative of an operating state of the resonant controller 100, wherein the operating state of the resonant controller 100 includes a starting state and a normal operating state. The over current protection unit 120 generates one of protection signals ProFun1~n in response to a determined result of the over current judgment unit 110 and the indication signal SSF, wherein n is an integer greater than one. The resonant controller 100 executes a corresponding protection process in response to the protection signal generated by the over current protection unit 120.

By the circuit design described in the foregoing, the resonant converting circuit of the present invention can provide different protection processes, such as restarting, latch protection, reducing the inputted electric power, and counting latch protection, corresponding to the different operating state of the resonant controller and different detecting result. Therefore, the resonant converting circuit and the resonant controller not only judge the state of over current of the circuit rapidly and accurately but also provide a perfect over current protection.

Figure 4:
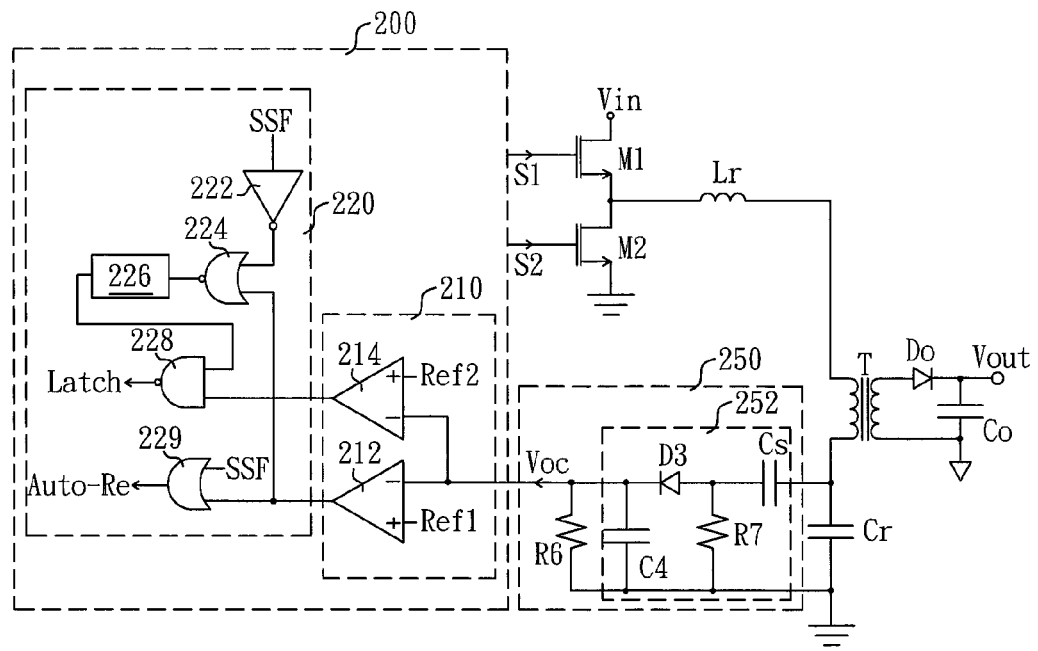
FIG. 4 is a schematic diagram of a resonant converting circuit according to a first embodiment of the present invention.

FIG. 4 is a schematic diagram of a resonant converting circuit according to a first embodiment of the present invention. The resonant converting circuit comprises a resonant circuit, a current detecting circuit 250 and a resonant controller 200. The resonant circuit comprises transistors M1 and M2, a transformer T, a resonant capacitance Cr, a resonant inductance Lr, a rectifying diode Do and an output capacitance Co. A primary side of the resonant circuit is coupled to an input power source Vin. The resonant circuit converts an electric power inputted from the input power source Vin to output an output voltage Vout in a secondary side of the resonant circuit according to control signals S1 and S2 generated by the resonant controller 200. The current detecting circuit 250 is coupled to the primary side of the resonant circuit and detects a resonant current flowing through the primary side of the resonant circuit to generate a current detecting signal Voc. The current detecting circuit 250 comprises an over current set circuit 252 and a peak set capacitance C4, wherein the over current set circuit 252 comprises a detecting capacitance Cs, a detecting resistance R7, a rectifying diode D3 and a delay set resistance R6. The detecting capacitance Cs is coupled to a terminal of the resonant capacitance Cr to detect the resonant current and generates a signal at a connecting node of the resonant capacitance Cr and the detecting resistance R7, whose level is in response to the amount of the resonant current. A peak of the signal at the connecting node is stored in the peak set capacitance C4 to generate the current detecting signal Voc after rectified by the rectifying diode D3. Therefore, the current detecting signal Voc is a signal that represents a peak of the resonant current in the present embodiment. The delay set resistance R6 is adapted to set a delay period for auto-restarting. When the resonant controller 200 pauses the power conversion of the resonant circuit (i.e. turns off the transistor switch M1), the peak set capacitance C4 is discharged by the delay set resistance R6 and so the level of the current detecting signal Voc is decreased to trigger the resonant controller 200 restarting. The length of the delay period can be set enough and properly by setting the capacitance value of the peak set capacitance C4 and the resistance value of the delay set resistance R6, without influence upon the periodic detection under normal operating state.

The resonant controller 200 generates the control signals S1 and S2 to control the turn-on and turn-off states of the transistor switches M1 and M2 in the resonant circuit, so as to control the amount of the electric power inputted from the input power source Vin. The resonant controller 200 comprises an over current judgment unit 210 and an over current protection unit 220. The over current judgment unit 210 determines whether the resonant current is over or not according to the current detecting signal Voc. The over current judgment unit 210 comprises two comparators 212 and 214. Both of inverting terminals of the comparators 212 and 214 receive the current detecting signal Voc and non-inverting terminals thereof respectively receive a first predetermined level Ref1 and a second predetermined level Ref2, wherein the first predetermined level Ref1 is lower than the second predetermined level Ref2. The comparators 212 and 214 output high-level signals when the level of the current detecting signal Voc is lower than the first predetermined level Ref1. The comparator 212 outputs a low-level signal and the comparator 214 outputs a high-level signal when the level of the current detecting signal Voc is higher than the first predetermined level Ref1 but lower than the second predetermined level Ref2. Two comparators 212 and 214 output low-level signals when the level of the current detecting signal Voc is higher than the second predetermined level Ref2. The current detecting signal Voc may be replaced with another signal representing the amount of the resonant current without affecting the function of the over current judgment unit 210 is determining whether the resonant current is over or not.

The over current protection unit 220 is coupled to the over current judgment unit 210 and receives an indication signal SSF indicative of an operating state of the resonant controller 200. The over current protection unit 220 outputs a latch protection signal LP or a restarting signal Auto-Re in response to a determined result of the over current judgment unit 210 and the indication signal SSF. Then, the resonant controller 200 executes a corresponding protection process. The over current protection unit 220 comprises an inverter 222, a NOR gate 224, a delay circuit 226, a NAND gate 228 and an OR gate 229.

The indication signal SSF is at high level when an operating state of the resonant controller 200 is a starting state. The indication signal SSF is inverted to be low level by the inverter 222 and then outputted to the NOR gate 224. The NOR gate 224 also receives a signal outputted by the comparator 212 in the same time. When the resonant controller operates under the starting state, the level of the current detecting signal Voc keeps be lower than the first predetermined level Ref1 and so the comparator 212 outputs a high-level signal if the resonant circuit operates normally. The NOR gate 224 outputs a low-level signal to the delay circuit 226 and so the delay circuit 226 outputs a signal with a default level of low-level. Meanwhile, the comparator 214 outputs a high-level signal due to that the current detecting signal Voc is lower than the second predetermined level Ref2. The NAND gate 228 receives the output signals outputted by the delay circuit 226 and the comparator 214 and at this time generates the latch protection signal LP with low-level. Therefore, the resonant controller 200 keeps operating and does not execute a latch protection process. The OR gate 229 receives the indication signal SSF and an output signal outputted by the comparator 212 and accordingly outputs the restarting signal Auto-Re with high-level under the starting state. The restarting signal Auto-Re with high-level blocks the restarting function of the resonant controller 200, and so the resonant controller 200 keeps operating and does not restarting.

Figure 5:
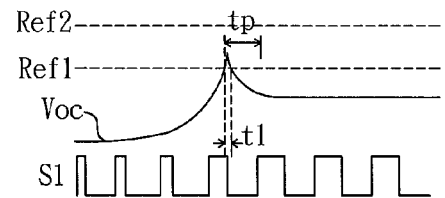
FIG. 5 (a)~(c) are waveform diagrams of situations under a starting state in the circuit shown in FIG. 4.
Figure 5:
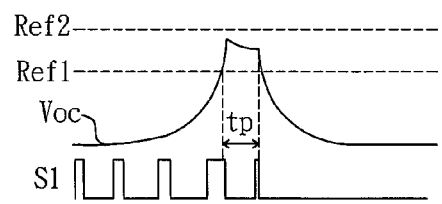
Figure 5:
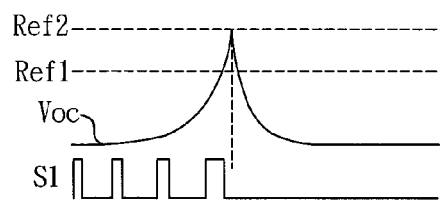

The current detecting signal Voc may be higher than the first predetermined level Ref1 but lower than the second predetermined level Ref2 temporarily due to that the resonant circuit usually induces a great but short period resonant current under the starting state. At this time, the comparator 212 outputs a low-level signal. Therefore, the NOR gate 224 outputs a high-level signal to trigger the delay circuit 226 to start time counting. FIG. 5 (a) is a waveform diagram of the resonant current when being over current temporarily. The resonant controller 200 keep generating the control signal S1 when a duration of the current detecting signal Voc higher than the first predetermined level Ref1's t1 is shorter than a predetermined time period tp. However, when the duration is longer than the predetermined time period tp, the delay circuit 226 outputs a low-level signal. FIG. 5 (b) is a waveform diagram of the resonant current when being over current lasting over a predetermined time period. The NADN gate 228 outputs the latch protection signal LP with high level when the resonant current is over for a predetermined time. Once the resonant controller 200 receives the latch protection signal LP with high level, the resonant controller 200 stops outputting the control signal S1 and enters latch protection process to execute a latch protection until that the resonant controller 200 is reset. Therefore, the problem of false over current under the starting state can be avoided by appropriately set the delay time of the delay circuit 226.

In addition, if the current detecting signal Voc is higher than the second predetermined level Ref2, the over current condition is not a false over current. FIG. 5 (c) is a waveform diagram of the current detecting signal Voc reaching the second predetermined level Ref2. When the current detecting signal Voc reaches the second predetermined level Ref2, the comparator 214 outputs a low-level signal and so the NAND gate 228 outputs the latch protection signal LP with high level. At this time, the resonant controller 200 stops outputting the control signal S1 and enters latch protection process until reset.

The indication signal SSF is at low level after the starting state, and it represents that the resonant controller 200 enters a normal operating state. The inverter 222 outputs a high-level signal and so the NOR gate 224 also outputs a high-level signal to block the delay circuit 226 to time count the delay time. Under the normal operating state, if the resonant current of the resonant circuit has no over current (i.e., the level of the current detecting signal Voc is lower than the first predetermined level Ref1), both of the comparators 212 and 214 output high-level signals. Therefore, the NAND 228 gate outputs the latch protection signal LP with low level and the OR gate 229 outputs the restarting signal Auto-Re with high level. The resonant controller 200 keeps operating normally.

Figure 6:
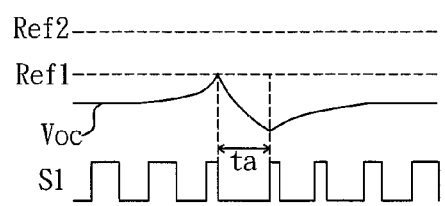
FIG. 6 (a)~(c) are waveform diagrams of situations when restarting under a normal operating state in the circuit shown in FIG. 4.
Figure 6:
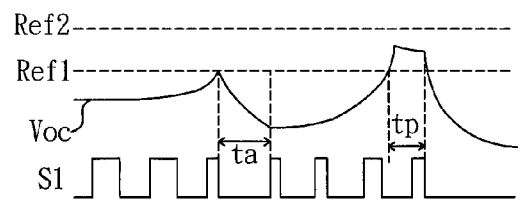
Figure 6:
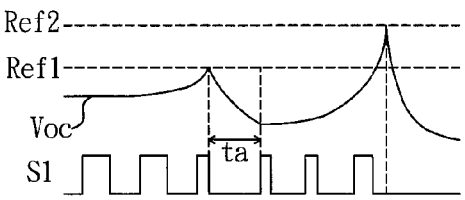

If the level of the current detecting signal Voc is increased abnormally to be higher than the first predetermined level Ref1, the comparator 212 outputs a low-level signal and so the OR gate 229 output the restarting signal Auto-Re with low level. Then, the resonant controller 200 executes the restarting process for pausing outputting the control signals S1 and S2 and time counting. The resonant controller 200 enters the starting state again after the resonant controller 200 pauses outputting the control signals S1 and S2 for a predetermined restarting time. FIG. 6 (a)~(c) are waveform diagrams of three situations when the resonant controller restarting. FIG. 6 (a) is a waveform diagram of that the resonant controller 200 restarts after pausing the power conversion of the resonant circuit over a pause time ta and restores to normally operating after restarted. FIG. 6 (b) is a waveform diagram of that the resonant controller 200 restarts after pausing the power conversion of the resonant circuit over a pause time ta and then the resonant controller 200 enters the latch protection state due to the resonant current being over current lasting a predetermined time. FIG. 6 (c) is a waveform diagram of that the resonant controller 200 restarts after pausing the power conversion of the resonant circuit over a pause time ta and then the resonant controller 200 enters the latch protection state due to that the level of the current detecting signal Voc reaches the second predetermined level Ref2 after restarted.

Figure 7:
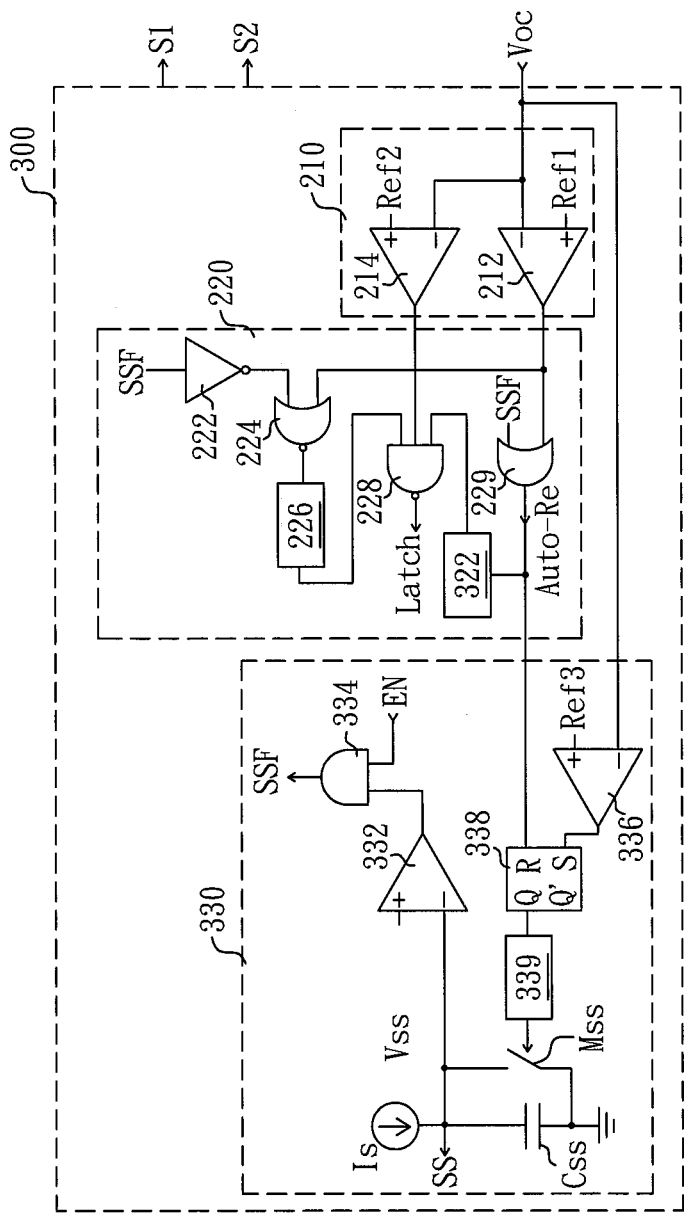
FIG. 7 is a schematic diagram of a resonant controller according to a second embodiment of the present invention.

FIG. 7 is a schematic diagram of a resonant controller according to a second embodiment of the present invention. The resonant circuit controlled by a resonant controller 300 of the present embodiment can be referred to the resonant circuit shown in FIG. 4. The resonant controller 300 is adapted to control the resonant circuit to convert an input voltage into an appreciate output voltage. The resonant controller 300 comprises an over current judgment unit 210, an over current protection unit 220 and a soft start unit 330. Compared to the over current protection unit 220 shown in FIG. 4, the over current protection unit 220 in the present embodiment extra adds a count circuit 322. The count circuit 322 is coupled to an OR gate 229 and a NAND gate 228 for counting a number of a restarting signal Auto-Re. A default output signal of the count circuit 322 is at high level. When the number of the restarting signal Auto-Re reaches a predetermined number, the count circuit 322 outputs a low-level signal and so the NAND gate 228 outputs a latch protection signal LP. At this time, the resonant controller 300 executes a latch protection process for stopping the power conversion of the resonant circuit. Thus, the resonant controller is capable of avoiding continuing to restart due to that the abnormal condition can be removed by restarting. The operations of the over current judgment unit 210 and the other components in the over current protection unit 220 are the same as that shown in FIG. 4, and so are not described here again.

The soft start unit 330 comprises a soft start current source Is, a soft start capacitance Css, a soft start switch Mss, two comparators 332 and 336, an AND gate 334, a RS flip-flop 338 and an one-shot circuit 339. The soft start unit 330 is adapted to provide a soft start process when the resonant controller 300 starting or restarting under the starting state and generates an indication signal SSF. When the resonant controller 300 receives a starting signal EN with high level, the resonant controller 300 starts. At this moment, the soft start switch Mss is turned off and the soft start current source Is charges the soft start capacitance Css to generate a soft start signal SS. The duty cycles of the control signals S1, S2 generated by the resonant controller 300 increase gradually with the soft start signal SS. An inverting input terminal of the comparator 332 receives the soft start signal SS and a non-inverting input terminal thereof receives a reference signal Vss. When a level of the soft start signal SS is lower than a level of the reference signal Vss, the comparator 332 outputs a high-level signal and so the AND gate 334 outputs the indication signal SSF with high level that represents that the resonant controller 300 is under the starting state. When the level of the soft start signal SS is increased to be higher than the level of the reference signal Vss, the comparator 332 outputs a low-level signal and so the AND gate 334 outputs the indication signal SSF with low level that represents that the resonant controller 300 is under the normal operating state.

A non-inverting input terminal of the comparator 336 receives a restarting judgment level Ref3 and an inverting input terminal thereof receives a current detecting signal Voc, wherein a level of the restarting judgment level Ref3 is lower than the level of the first predetermined level Ref1. An input terminal R of the RS flip-flop 338 is coupled to the OR gate 229 in the over current protection unit 220 to receive the restarting signal Auto-Re, an input terminal S thereof is coupled to an output terminal of the comparator 336 and an output terminal Q thereof is coupled to the one-shot circuit 339. An output terminal of the one-shop circuit 339 is coupled to the soft start switch Mss to switch the soft start switch Mss. The output terminal Q of the RS flip-flop 338 outputs a low-level signal when the over current protection unit 220 outputs the restarting signal Auto-Re with high level. At this time, the one-shot circuit 339 does not activate, the soft start switch Mss is turned off, and so the soft start capacitance Css is charged by the soft start current source Is. When the over current protection unit 220 outputs the restarting signal Auto-Re with low level, the resonant controller 300 stops outputting the control signals S1 and S2 and so the electric power of the input power source is stopped providing into the resonant circuit. Then, the electric power stored in the resonant circuit starts to decrease. The delay set resistance R6 in the current detecting circuit 250 shown in FIG. 4 starts discharging the peak set capacitance C4 and so the level of the current detecting signal Voc is decreased. When the level of the current detecting signal Voc is decreased to be lower than the level of the restarting judgment level Ref3, the comparator 336 outputs a high-level signal to trigger the RS flip-flop 338 to output a high-level signal at the output terminal Q. When the one-shot circuit 339 detects the high-level signal outputted by the RS flip-flop 338, the one-shot circuit 339 generates a pulse signal to turn on the soft start switch Mss in a short time. The soft start capacitance Css is discharged to make the level of the soft start signal SS decreased to zero. At this moment, the indication signal SSF is returned to be at high level, and so the resonant controller enters the starting state.

The delay time period for restarting the resonant controller 200 shown in FIG. 4 is a predetermined time period. On the other hand, in the present embodiment, the delay time period for restarting the resonant controller 300 is setting by the delay set resistance R6 and the peak set capacitance C4. Therefore, the delay time period may be modulated according to a request of an actual application to ensure the energy stored in the resonant circuit being decreased to an enough low level.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A resonant converting circuit comprising:
   a resonant circuit, adapted to execute a power conversion for converting an input voltage into an output voltage;
   a current detecting circuit, coupled to a primary side of the resonant circuit to detect a resonant current flowing through the primary side of the resonant circuit and generating a current detecting signal; and
   a resonant controller, controlling the power conversion of the resonant circuit, wherein the resonant controller comprises an over current judgment unit and an over current protection unit, the over current judgment unit determines whether the resonant current is higher than an over current value according to the current detecting signal, the over current protection unit generates a protection signal in response to a determined result of the over current judgment unit and an indication signal indicative of an operating state of the resonant controller;
   wherein, the resonant controller executes a corresponding protection process in response to the protection signal, and the operating states of the resonant controller include a starting state and a normal operating state,
   wherein when the indication signal indicates that the resonant controller operates under the starting state and one of the current detecting signal is higher than a first predetermined level for a predetermined time period and the current detecting signal is higher than a second predetermined level occurs, the resonant controller enters a latch process to stop the power conversion of the resonant circuit, wherein the first predetermined level is lower than the second predetermined level.

2. The resonant converting circuit according to claim 1, wherein the resonant controller further comprises a soft start unit which generates the indication signal, and executes a soft start process when the resonant controller starts or restarts.

3. The resonant converting circuit according to claim 1, wherein when the indication signal indicates that the resonant controller operates under the normal operating state and the current detecting signal is higher than a first predetermined level, the resonant controller pauses the power conversion of the resonant circuit and then restarts.

4. The resonant converting circuit according to claim 3, wherein the current detecting circuit comprises a peak set capacitance for generating the current detecting signal according to a peak of the resonant current.

5. The resonant converting circuit according to claim 4, wherein the current detecting circuit further comprises a delay set resistance which is connected to the peak set capacitance in parallel for setting a time period of the resonant controller pausing the power conversion of the resonant circuit.

6. The resonant converting circuit according to claim 3, wherein after the resonant controller pauses the power conversion of the resonant circuit, the resonant controller restarts when the current detecting signal is lower than a restart judgment level, wherein the restart judgment level is lower than the first predetermined level.

7. The resonant converting circuit according to claim 3, wherein the over current judgment unit further comprises a count circuit to count a number of the current detecting signal being higher than the first predetermined level when the resonant controller operates under the normal operating state, and the resonant controller enters the latch process to stop the power conversion of the resonant circuit when the number reaches a predetermined value.

8. A resonant controller, adapted to control a power conversion of a resonant circuit, comprising:
an over current judgment unit, determining whether the resonant current is higher than an over current value according to a current detecting signal indicative of a resonant current of the resonant circuit; and
an over current protection unit, generating a protection signal in response to a determined result of the over current judgment unit and an indication signal indicative of the resonant controller operating under a starting state or a normal operating state;
wherein, the resonant controller executes a corresponding protection process in response to the protection signal,
wherein when the indication signal indicates that the resonant controller operates under the starting state and one of the current detecting signal is higher than a first predetermined level for a predetermined time period and the current detecting signal is higher than a second predetermined level occurs, the resonant controller enters a latch process to stop the power conversion of the resonant circuit, wherein the first predetermined level is lower than the second predetermined level.

9. The resonant controller according to claim 8, wherein the resonant controller further comprises a soft start unit which generates the indication signal, and executes a soft start process when the resonant controller starts or restarts.

10. The resonant controller according to claim 8, wherein when the indication signal indicates that the resonant controller operates under the normal operating state and the current detecting signal is higher than a first predetermined level, the resonant controller pauses the power conversion of the resonant circuit and then restarts.

11. The resonant controller according to claim 10, wherein after the resonant controller pauses the power conversion of the resonant circuit, the resonant controller restarts when the current detecting signal is lower than a restart judgment level, wherein the restart judgment level is lower than the first predetermined level.

12. The resonant controller according to claim 10, wherein the over current judgment unit further comprises a count circuit to count a number of the current detecting signal being higher than the first predetermined level when the resonant controller operates under the normal operating state, and the resonant controller enters the latch process to stop the power conversion of the resonant circuit when the number reaches a predetermined value.

* * * * *